United States Patent Office 2,941,099
Patented June 14, 1960

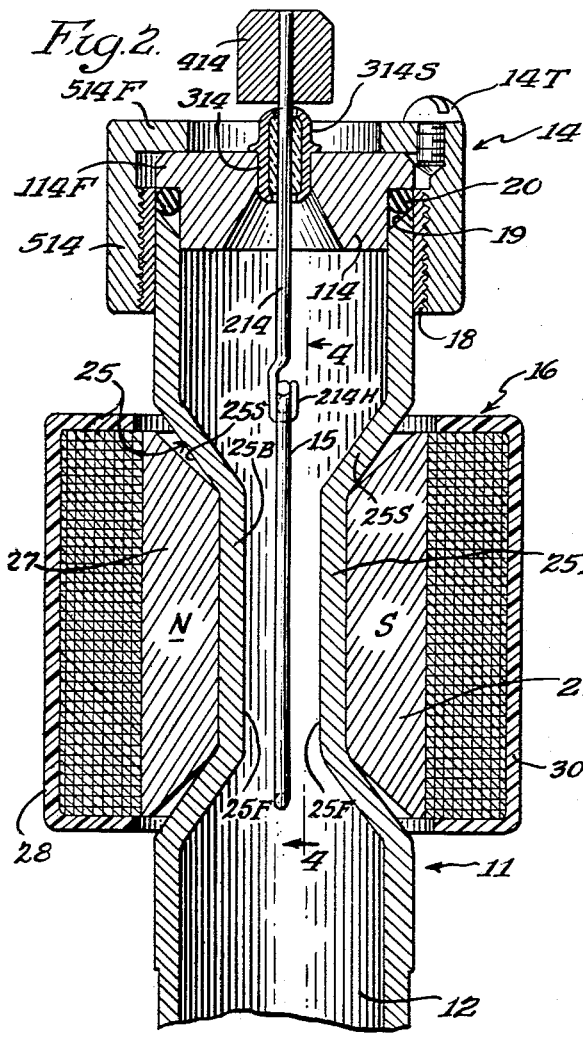
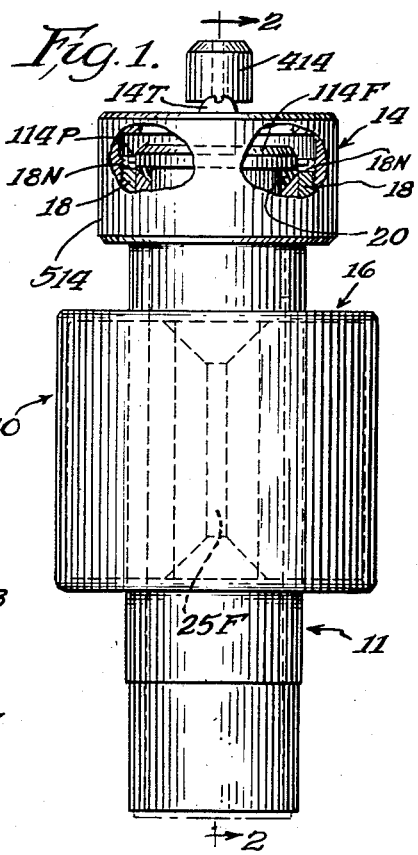
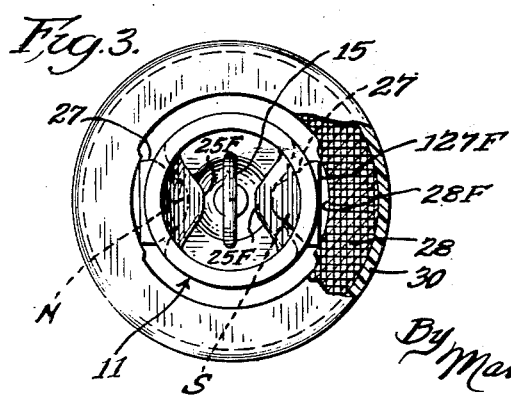
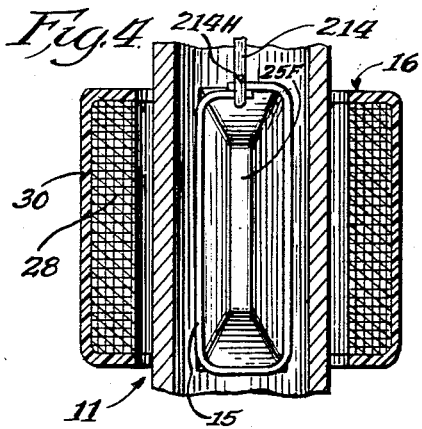
Inventors
Robert G. Picard
Joseph A. Le Blanc
By Mann, Brown & McWilliams
Attys.

2,941,099

COLD CATHODE IONIZATION GAUGE

Robert G. Picard, Highland Park, and Joseph A. Le Blanc, Chicago, Ill., assignors to Central Scientific Company, Chicago, Ill.

Filed Nov. 17, 1958, Ser. No. 774,520

13 Claims. (Cl. 313—7)

This invention relates to ionization gauges and particularly to such gauges of the cold cathode, magnetically sensitized type usually known as Philips gauges.

Cold cathode ionization gauges of the aforesaid type have for many years been found to be extremely useful in high vacuum work and one of the primary characteristics that was of value was that they cannot be burned out by accidental exposure to atmospheric pressures. Moreover, such gauges have been found to operate reliably at pressures several orders of magnitude lower than Pirani gauges and thermocouple gauges.

It has long been known, however, that such cold cathode gauges possess certain disadvantages arising from progressive contamination of the electrodes. Such contamination has resulted in part from sputtering between the electrodes of the gauges and in part from the deposition of material from the atmosphere being evacuated. Such material tends to break down and be deposited on the electrodes by the glow discharge between such electrodes.

In view of the foregoing the primary object of the present invention is to provide an improved cold cathode ionization gauge wherein the foregoing difficulties are avoided, to the end that such improved gauges will operate accurately throughout a greater useful life, and an object related to the foregoing is to provide such an improved cold cathode gauge wherein difficulties due to sputtering are in a large measure eliminated. Other and related objects are to provide a cold cathode gauge of the aforesaid character that may readily and easily be cleaned, and wherein the primary structural elements of the gauge may be readily dismantled in such a way as to facilitate such cleaning, and which may then be readily re-assembled in an accurate relationship.

In the manufacture of gauges of the aforesaid character as heretofore carried out, difficulty has been experienced in attaining uniformity of operation as between different gauges, and a further improtant object of the present invention is to provide a gauge structure wherein the desired relationship of the parts of the gauge may be readily and easily attained in a uniform manner in the usual manufacturing processes. Another important object is to provide an improved gauge of the aforesaid character that is so constructed as to minimize the possibilities of leakage.

Accuracy and uniformity of operation of gauges of the aforesaid character is dependent at least to some extent upon the nature or character of the magnetic field that is afforded within the envelope, and to some extent upon the accuracy of definition of the effective cathode surfaces and their relation to the magnetic flux path. It is another important object of the present invention to provide a gauge of this character in which the effective cathode surfaces as well as the primary magnetic flux path are both well defined and are related one to the other in a uniform and highly effective manner; and related objects are to provide a definitely determined and a more efficient magnetic circuit and to provide this improved magnetic circuit in a simple structure that is adapted for efficient and accurate manufacture and assembly in a predetermined relation to the effective cathode surfaces of the gauge.

Other and further objects of the present invention will be apparent from the following description and claims, and are illustrated in the accompanying drawings, which, by way of illustration, show a preferred embodiment of the present invention and the principles thereof, and what is now considered to be the best mode in which to apply these principles. Other embodiments of the invention embodying the same or equivalent principles may be used and structural changes may be made as desired by those skilled in the art without departing from the invention.

In the drawings:

Fig. 1 is a side elevational view of a cold cathode ionization gauge embodying the features of the invention;

Fig. 2 is an elongated sectional view of the gauge as taken along the lines 2—2 of Fig. 1, but showing the upper closure partially released;

Fig. 3 is a bottom elevational view looking into the open end of the gauge; and

Fig. 4 is a fragmentary sectional view taken along the line 4—4 of Fig. 2 showing the anode in its proper endwise relation in the envelope.

For purposes of disclosure the invention is herein illustrated as embodied in a cold cathode ionization gauge 10 comprising a non-magnetic elongated generally tubular envelope 11 formed from cathodal metal and having one end 12 open for association in the usual manner with a vacuum system and having a detachable end closure structure 14 at the other end of the envelope 11 to removably support a ring-type anode 15 within the envelope 11 intermediate its ends and in position between a permanent magnetic structure 16 that provides a well defined magnetic flux path through or transversely of the non-magnetic envelope so that the ring-type anode 15 encircles the primary magnetic flux path.

The detachable structure 14 includes a screw terminal 14T whereby one side of an electrical circuit may be connected to the metal envelope 11, while the closure structure also includes a brass cap 114 from which a rigid support rod 214 projects downwardly to support the anode 15. The rod 214 has a hook 214H at its lower end, and the anode 15 is formed from wire in a rectangular shape with the ends thereof lapped over each other within the hook as shown in Fig. 4, and secured in place by metal fusion processes. The rod 214 is supported in the cap 114 by a flanged metal fitting 314 in a sealed relationship with respect to the cap 114, and on the upper or outer side of the cap 114, the fitting 314 having an internal insulating sleeve 314S of glass, surrounding the rod 214 within the fitting 314 and fused to the fitting and the rod in a sealed relation. The rod 214 projects beyond the upper end of the sleeve 314S and has a metallic connector 414 associated therewith for connecting the anode 15 to the other side of any conventional electrical control or indicating circuit.

In accordance with the present invention the envelope 11 is made from a seamless metal tube which may be readily tested for leaks and which in the course of the manufacturing operation is given a special form, as will be described, which does not in any way tend to rupture or break the metal of the tube, and in this way there is assurance that there will be no leaks in the tube. Actually the tube material is semi-hard as commercially available and is annealed dead soft for the metal working operations that are required.

At its upper end, as viewed in Fig. 2, the tubular member 11 has an annular mounting ring 18 secured thereto by a shrink fit, and the outer annular surface of the member 18 is screw-threaded to serve as a means for attaching the closure structure 14 to the tube. It will be noted that in Fig. 2 that the annular ring 18 projects slightly above the upper end of the tube 11, and the upper end of the tube 11 is sloped inwardly and downwardly as indicated at 19 to provide an annular sloping surface of the upper end of the envelope 11, as will be described.

The cap 114, as shown particularly in Fig. 2, has lower portion of its outer annular surface reduced to a diameter that is complemental to the internal diameter of the envelope 11, and at its upper portion, the cap 114 has an outwardly projecting flange 114F that is of such a diameter that it will fit snugly and slidably into the upper end of the threaded ring 18. This formation of the cap 114 and the upper end surface of the envelope 11 provides an annular packing recess in which a suitable packing means such as an O-ring 20 is disposed, and by forcing the cap 114 downwardly, the O-ring 20 is compressed and the upper end of the envelope 11 is sealed. In this structure the O-ring is effectually isolated from the vacuum system to protect the system against contamination, and the O-ring is shielded from the tube discharge to prevent break-down of the material of the O-ring by such discharge.

Such sealing action is attained by a threaded coupling member 514 that forms a part of the closure structure 14 and which has an inward annular flange 514F at its upper end which overlies the border portion of the flange 114F. In assuring accurate and reliable operation of the gauge it is essential that the anode 15 be located in a predetermined plane, and to enable such location to be attained the collar 18 has one or more notches 18N in its upper edge to receive complemental locating pins 114P that extend radially from the flange 114F. These pins are pressed into the notches as the coupling member 514 is tightened, as shown in Fig. 1. Thus, the clamping sleeve 514 may be screwed downwardly on the threaded ring 18 to effectually seal the upper end of the envelope 11, while at the same time locating the anode in a predetermined position in the envelope 11. The tightening of the closure structure also shifts the anode 15 endwise of the envelope 11 to the relation of Fig. 4 wherein the anode is accurately centered relative to the pole faces. The closure structure that produces this seal may be readily detached so as to enable the cap 114 and the associated anode 15 to be withdrawn from the upper end of the envelope 11 for cleaning and like purposes.

Under the present invention the envelope 11 and the anode 15 are both formed from aluminum, and we have determined that this metal when thus used does not sputter to any appreciable extent so that contamination of the anode and the cathode surfaces is minimized. The tendency toward sputtering may be further reduced by making the anode loop from an aluminum wire having a diameter that is as large as is practical, and since this reduces the electrical field about the surface of the anode, any sputtering tendency is further reduced.

The present invention provides an unusually effective and reliable magnetic circuit and this result is achieved by so forming and relating the magnetic means to the envelope 11 that contact of the individual elements of the magnetic circuit is inherently maintained, and providing the poles of the magnetic circuits that are well defined and are related to each other and to the effective cathode areas of the envelope 11 in a definite manner due particularly to the mechanical structure and relationship of the envelope 11 and the elements of the magnetic means. Thus, the envelope 11 in the areas opposite the anode 15 is formed with indentations 25 which are elongated in the direction of the length of the envelope 11 and which provide elongated rectangular internal faces 25F that are of the same size and that are located symmetrically on opposite sides of the axis of the envelope 11, and these faces 25F, being much closer to each other and to the plane of the anode 15 than the other internal surfaces of the envelope 11, constitute the primary effective cathode surfaces of the envelope 11.

The indentations 25 have sloping side walls 25S and bottom walls 25B which define the faces 25F, and the indentations 25 serve to receive soft iron pole pieces 27 that are generally in the form of truncated rectangular pyramids. The smaller or truncated faces which are seated at the rectangular bottom walls 25B of the recesses 25, and the sloping sides of the pole pieces 27 are arranged so that they slope away from the sloping side walls 25S of the recess 25. Thus contact of the pole pieces 27 with the envelope 11 is confined substantially to the rectangular bottom walls 25B of the recess 25.

The pole pieces 27 have permanent magnetic means associated therewith so that one pole piece constitutes a north pole while the other pole piece constitutes a south pole. The permanent magnetic means are preferably in the form of a ring magnet 28 that encircles the envelope 11 opposite the indentations 25, and where such ring magnet 28 is opposite the pole pieces 27, the magnet has inward arcuate projections ground to provide inward concave arcuate faces 28F for engaging outwardly convex faces 127F of the pole pieces 27. The parts are so proportioned that in assembly the pole pieces 27 are put in position and pressed slightly toward each other while the magnet 28 is slid endwise into surrounding relation, and as this operation is completed, the tension of the metal of the envelope 11 urges the pole pieces outwardly and maintains contact of the magnet and the pole pieces. The permanent magnet 28 is thus held in the desired relationship with the faces 28F held in firm magnetic contact with the arcuate outer faces 127F of the pole pieces 27, while the inner faces of the pole pieces 27 are held in firm magnetic contact with the rectangular bottom walls 25B of the indentations 25. The resiliency of the metal of the envelope 11 thus contributes to the maintenance of good magnetic contact of the various components of the magnetic circuit. After assembly the magnet 28 is magnetized to impart north and south polarities to the respective pole pieces 27, and preferably the exposed outer surfaces of the magnet 28 are covered with a plastic coating 30 of a material such as neoprene.

With the structure thus described, the rectangular faces 25F constitute well defined and properly aligned cathode surfaces that bear an accurately determined relation to the pole faces of the pole pieces 27, and hence there is a uniform magnetic gap through which the magnetic flux passes in a predetermined relation to the effective cathode surfaces, and furthermore the ring type anode 15 is accurately located with respect to these pole faces so as to encircle the primary flux path. Thus both the magnetic field and the electric field are accurately determined and are accurately related so as to promote reliable and uniform operation of the gauge.

As hereinabove pointed out, the use of aluminum to provide both the anode and the cathode of the gauge serves to materially reduce sputtering with the resulting contamination of the electrodes. When contamination does occur due either to the relatively small amount of sputtering that does take place or to break down and deposition of material from the atmosphere that is being evacuated, the present structure may be readily disassembled so that the anode 15 may be cleaned by brushing or like processes, and the internal surfaces of the envelope 11 may be cleaned by brushing or like cleaning processes. With the foregoing structure it has been found that in manufacture the elements may be formed and assembled in such a way that uniform and reproducible performance of the gauge is attained, while in re-assembly after cleaning, the desired accurate relationship of the elements is readily and easily re-established.

From the foregoing description it will be apparent that the present invention provides an improved Philips gauge in which difficulties and inaccuracies of operation due to contamination of the parts of the electrodes are in a large measure eliminated, and it will also be apparent that the present gauge is so constructed and arranged that where contamination of the electrodes is encountered, the gauge may be readily taken apart and may be readily cleaned and re-assembled so as to re-establish accuracy of operation.

It will also be apparent that the present invention provides an improved cold cathode ionization gauge in which the structure is such that leakage problems are in a large measure eliminated due to the way in which the parts of the gauge are made and associated. Furthermore, it will be apparent that the present gauge is one in which the magnetic and electric fields are accurately defined and are accurately related one to the other, and further it will be apparent that this accurate relationship of the magnetic and electric fields is attained in such a way that the parts of the gauge may be manufactured and assembled in an economic manner and in which the particular form and relationship of the parts assures that such gauges may be manufactured in a reproducible manner so as to thereby reduce the cost of production of the gauges.

Thus while we have illustrated and described a preferred embodiment of our invention it is to be understood that changes and variations may be made by those skilled in the art without departing from the spirit and scope of the appending claims.

We claim:

1. In a cold cathode ionization gauge, an elongated seamless aluminum tube open at one end for association with a vacuum system, permanent magnet means disposed outside of the tube with opposite poles defining a primary magnetic flux path transversely of the axis of the tube and intermediate its ends, detachable closure means closing the other end of said tube, an aluminum anode ring carried by said closure means in insulated relation to the tube and disposed within the tube in position to encircle said primary flux path.

2. In a cold cathode ionization gauge, an elongated seamless aluminum tube, permanent magnet means disposed outside of the tube with opposite poles defining a primary magnetic flux path across the axis of the tube intermediate its ends, one end of said tube being open for mounting the tube in communication with a vacuum system, means including a cap closing the other end of said tube, an aluminum anode ring carried by said cap in an insulated relation and disposed within the tube in position to encircle said primary flux path, cooperating separable means on said cap and said tube for locating said anode ring in a predetermined rotative relation in the tube, and means detachably securing said cap in sealed relation on said tube.

3. In a cold cathode ionization gauge, an elongated seamless aluminum tube open at one end for association with a vacuum system, permanent magnet means disposed outside of the tube with opposite poles defining a primary magnetic flux path across the axis of the tube intermediate its ends, a cap closing the other end of said tube, packing means between said cap and said other end of the tube, an aluminum anode ring carried in an insulated relation by said cap and disposed within the tube in position to encircle said primary flux path, and means detachably securing said cap on said tube with said packing means sealing said cap with respect to the tube.

4. In a cold cathode ionization gauge, an elongated seamless aluminum tube having similarly shaped indentations at opposite sides intermediate its ends to form spaced internal cathode areas of like form symmetrically related on opposite sides of the axis of the tube, pole pieces disposed in the respective indentations, permanent magnet means associated with said pole pieces to impart opposite polarities thereto, said tube being open for mounting the tube in communication with a vacuum system, a cap closing the other end of said tube, an aluminum anode ring carried in insulated relation by said cap and disposed within the tube and between said indentations in a position wherein it encircles the primary flux path between said pole pieces, and means detachably securing said cap in sealed relation on said tube.

5. In a cold cathode ionization gauge, an elongated seamless cathodal metal tube having similarly formed indentations at opposite sides intermediate its ends to form spaced internal cathode areas of like form symmetrically related on opposite sides of the axis of the tube, pole pieces disposed in the respective indentations, a ring shaped permanent magnet encircling the tube and engaged with said pole pieces to impart opposite polarities thereto, and said magnet means being in contact with and holding said pole pieces firmly in position on said indentations, end of said tube being open for mounting the tube in communication with a vacuum system, a cap closing the other end of said tube, a metal anode ring carried in insulated relation by said cap and disposed within the tube and between said indentations in a position wherein it encircles the primary flux path between said pole pieces, and means detachably securing said cap in sealed relation on said tube.

6. In a cathode ionization gauge, an elongated seamless non-magnetic cathodal metal tube open at one end for connection with a vacuum system and having similarly formed indentations at opposite sides intermediate its ends to form spaced internal cathode areas of like form symmetrically related on opposite sides of the axis of the tube, pole pieces disposed in the respective indentations, permanent magnet means associated with said pole pieces to impart opposite polarities thereto and holding said pole pieces firmly in position, a detachable closure structure closing the other end of said tube, and metal anode ring carried by said closure structure in insulated relation to said tube and disposed within the tube and between said indentations in a position wherein it encircles the primary flux path between said pole pieces.

7. In a cold cathode ionization gauge, an elongated seamless non-magnetic cathodal metal tube having similarly formed indentations each having side and bottom walls and located at opposite sides intermediate its ends so that said bottom walls provide spaced internal cathode areas of like form symmetrically related on opposite sides of the axis of the tube, pole pieces disposed in respective indentations and in contact with the respective bottom walls and spaced from the side walls of the indentations, permanent magnet means associated with said pole pieces to impart opposite polarities thereto and holding said pole pieces in position, one end of said tube being open for mounting the tube in communication with a vacuum system, a cap closing the other end of said tube, metal anode ring carried in insulated relation by said cap and disposed within the tube and between said indentations in a position wherein it encircles the primary flux path between said pole pieces, and means detachably securing said cap in sealed relation on said tube.

8. In a cold cathode ionization gauge, an elongated non-magnetic cathodal metal tube having similarly formed indentations each having side and bottom walls and located at opposite sides intermediate its ends so that said bottom walls provide spaced internal cathode areas of like form symmetrically related on opposite sides of the axis of the tube, pole pieces disposed in respective indentations in contact with the respective bottom walls and spaced from the side walls of the indentations, a permanent magnet of ring-like form encircling the tube and engaging said pole pieces to impart opposite polarities thereto, and hold pole pieces in position in firm contact with said bottom walls, one end of said tube being open for mounting the tube in communication with a vacuum system, and means closing the other end of said tube and having metal anode ring carried thereby disposed within the tube and between said indentations in a position wherein it encircles the primary flux path between said pole pieces.

9. In a cold cathode ionization gauge, an elongated non-magnetic cathodal metal tube closed at one end and open at the other for association with a vacuum system, and said tube having similarly formed indentations each having side and bottom walls and located at opposite sides intermediate the ends of the tube so that said bottom walls are parallel and provide spaced internal cathode areas of like form symmetrically related on opposite sides of the axis of the tube, pole pieces disposed in respective indentations and in contact with the respective bottom walls and spaced from the side walls of the indentations, a ring-like permanent magnet encircling the tube and engaging said pole pieces to impart opposite polarities thereto and hold said pole pieces in position in said indentations, and a metal anode ring supported within and in insulated relation to the tube and between said indentations in a position where it encircles the primary flux path between said pole pieces.

10. In a cold cathode ionization gauge, an elongated seamless aluminum tube having pole pieces located against the outside of the tube at opposite sides intermediate its ends to form spaced poles symmetrically related on opposite sides of the axis of the tube, permanent magnet means associated with said pole pieces to hold the same in place and impart opposite polarities thereto, one end of said tube being open for mounting the tube in communication with a vacuum system, a cap closing the other end of said tube, an aluminum anode ring carried by said cap in insulated relation and disposed within the tube and between said indentations in a position wherein it encircles the primary flux path between said pole pieces, and means detachably securing said cap in sealed relation on said tube.

11. In a cold cathode ionization gauge, an elongated seamless aluminum tube with one open end and having pole pieces located against the outside of the tube at opposite sides intermediate its ends to form spaced poles symmetrically related on opposite sides of the axis of the tube, permanent magnet means associated with said pole pieces to hold the same in place and impart opposite polarities thereto, a cap closing the other end of said tube, an anode ring carried by said cap in insulated relation and disposed within the tube and between said indentations in a position where it encircles the primary flux path between said pole pieces, means detachably securing said cap in sealed relation on said tube, and means for locating said anode ring in a predetermined rotative relation with respect to the axis of the tube.

12. As an element of a cold cathode ionization gauge, an elongated seamless non-magnetic cathodal metal tube having similarly formed indentations each having side and bottom walls and located at opposite sides intermediate its ends so that said bottom walls are parallel and provide spaced internal cathode areas of like form symmetrically related on opposite sides of the axis of the tube, pole pieces disposed in respective indentations and in contact with the respective bottom walls and spaced from the side walls of the indentations, and permanent magnet means associated with said pole pieces to impart opposite polarities thereto and hold said pole pieces firmly in position on said indentations, means at one end of said tube for mounting the tube in communication with a vacuum system, a cap closing the other end of said tube, metal anode ring carried by said cap and disposed within the tube and between said indentations in a position wherein it encircles the flux path between said pole pieces, and means detachably securing said cap in sealed relation on said tube.

13. A subassembly for a cold cathode ionization gauge comprising a non-magnetic cathodal metal tube having correspondingly sized indentations formed therein on opposite sides to provide sloping side walls and parallel bottom walls in the indentations, pole pieces disposed in respective indentations and in contact with the respective bottom walls and spaced from the side walls of the indentations, and permanent magnet means associated with said pole pieces to impart opposite polarities thereto and hold said pole pieces firmly in position on said indentations.

References Cited in the file of this patent

UNITED STATES PATENTS

| | | |
|---|---|---|
| 2,745,059 | Gauger | May 8, 1956 |
| 2,758,232 | Fox | Aug. 7, 1956 |